United States Patent
Chamberlin, Jr.

(10) Patent No.: US 6,781,538 B1
(45) Date of Patent: Aug. 24, 2004

(54) POTENTIOMETER CONTROLLER HAVING A DIGITAL OUTPUT

(75) Inventor: Howard A. Chamberlin, Jr., Incheon (KR)

(73) Assignee: Kurzweil Co., Ltd., Seoul (KR)

( * ) Notice: Subject to any disclaimer, the term of this patent is extended or adjusted under 35 U.S.C. 154(b) by 0 days.

(21) Appl. No.: 10/636,402

(22) Filed: Aug. 7, 2003

Related U.S. Application Data

(60) Provisional application No. 60/401,834, filed on Aug. 7, 2002.

(51) Int. Cl.[7] .............................................. H03M 1/80
(52) U.S. Cl. ...................... 341/153; 330/296; 341/155
(58) Field of Search .................. 341/153, 155; 330/296; 702/183; 323/324; 708/6

(56) References Cited

U.S. PATENT DOCUMENTS

| | | | | | |
|---|---|---|---|---|---|
| 2,950,052 | A | * | 8/1960 | Knox | 708/6 |
| 4,734,869 | A | * | 3/1988 | Mickowski | 702/183 |
| 5,099,193 | A | * | 3/1992 | Moseley et al. | 323/324 |
| 6,563,385 | B2 | * | 5/2003 | Wojslaw | 330/296 |

* cited by examiner

*Primary Examiner*—Jean Bruner Jeanglaude
(74) *Attorney, Agent, or Firm*—Cesari and McKenna, LLP

(57) ABSTRACT

A thumb wheel controller that converts the output of a thumb-wheel actuated potentiometer to a digital representation of the thumb-wheel position. The controller includes a pair of operational amplifiers whose linear ranges coincide with the thumb wheel range segments above and below a central dead band and whose output voltage ranges correspond to the digital range of the controller output.

6 Claims, 2 Drawing Sheets

POTENTIOMETER CONTROLLER HAVING A DIGITAL OUTPUT

CROSS-REFERENCE TO RELATED APPLICATIONS

The present application claims the benefit of U.S. Provisional Patent Application Serial No. 60/401,834, which was filed on Aug. 7, 2002, by Howard A. Chamberlin, Jr. for a POTENTIOMETER CONTROLLER HAVING A DIGITAL OUTPUT and is hereby incorporated by reference.

BACKGROUND OF THE INVENTION

1. Field of the Invention

The present invention relates to a potentiometer wheel controller that provides a digital output corresponding to the position of the wiper of a potentiometer. The invention is of particular use in connection with thumb wheels used to control such functions as pitchbend and vibrato in digital music synthesizers.

2. Background Information

A typical music synthesizer may include a pair of thumb wheel controllers, one for pitchbend and the other for modulation functions such as vibrato and the like. Each of these controllers comprises a thumb wheel mechanically coupled to a potentiometer. A voltage is applied across the potentiometer and the resulting voltage at the moveable contact, or wiper, of the potentiometer is converted to a digital output, usually according to a MIDI (Musical Instrument Digital Interface) format. In order to compensate for such factors as tolerance variations in various components, the voltage applied to the potentiometer is also the reference voltage used by the analog-digital converter (ADC) that converts the potentiometer wiper voltage to a digital representation. However, a typical thumb wheel mechanism usually rotates the potentiometer through only a fraction of the rotational range of the wiper. For example, the thumb wheel itself may be readily rotational through only a ninety-degree angle corresponding to 30–33 percent of the total potentiometer range. Thus, given the use of an eight-bit converter to minimize costs, the thumb wheel range corresponds to only around 80 steps of the 256-step range of the converter. This is too coarse for many purposes, especially when controlling pitch.

In order to "stretch" the rotational range of the potentiometer to cover the full range of the ADC, one might use a custom potentiometer whose resistance element has been designed to cover only ninety degrees of rotation. However, the tooling expense and quantity commitment for such a part are not practical for applications where relatively small numbers are required. Another possibility is to increase the voltage across the potentiometer. However, this requires a second highly-regulated reference voltage. Furthermore, it may result in overdriving the ADC. A third method, which is currently in use, is to amplify the voltage swing from the potentiometer so as to cover the range of the ADC. If a true "rail-to-rail" amplifier is used and is powered by the reference voltage, there is no possibility of overdriving the ADC.

A thumb wheel used for a pitchbend ordinarily is connected to a spring mechanism that returns the wheel to its center position. It is important that when the wheel is released and returned by the spring mechanism, the converted digital output be returned exactly to its center value. Similarly, if the thumb wheel is set up for dual modulations, it is provided with a mechanical detent which ideally holds the control at its exact center where both the modulations are to be zero. With an 8-bit ADC the exact digital center is 128 for the usual case of unipolar coding. Mechanical or electrical centering methods can be employed to make this nominally true, but even a small amount of mechanical backlash, play or electrical drift will produce a center error of one bit or more.

In order to cope with mechanical and electrical tolerance variations while insuring that the mechanical center of the thumb wheel corresponds with the digital center, software is provided to implement a deadband in the middle of the digital range. For example, with an 8-bit ADC the software might consider any reading between 124 and 132 as the center, instead of only the center value 128. This provides a deadband tolerance of ±4 bits around the center value. The total range each side of center is then 123 steps instead of 127.

This results in a problem when dual modulation is implemented with a thumb wheel. The MIDI modulation values are typically represented by seven bits, corresponding to 128 steps. When a 123-step reduced wheel range is scaled to cover the 128 step MIDI modulation range, some one-bit thumb wheel movements result in 2-bit MIDI modulation changes while others result in a single-bit modulation change, resulting in a rough change in modulation level in response to smooth rotation of the thumb wheel.

SUMMARY OF THE INVENTION

A thumb wheel controller incorporating the invention uses analog circuitry to implement a center-position deadband. Specifically, it includes a pair of operational amplifiers biased so that one covers a lower thumb wheel range segment below the deadband and the other covers an upper range segment above the deadband. The gain of each amplifier is such that its full range of output voltages corresponds to the full lower (or upper) thumb wheel range segment. A single analog-digital converter may be multiplexed to the outputs of the two amplifiers and thus a single ADC can provide a full representation of thumb wheel position in each of the lower and upper range segments, resulting in a 512-step (9-bit) representation of the full range of thumb wheel rotation.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
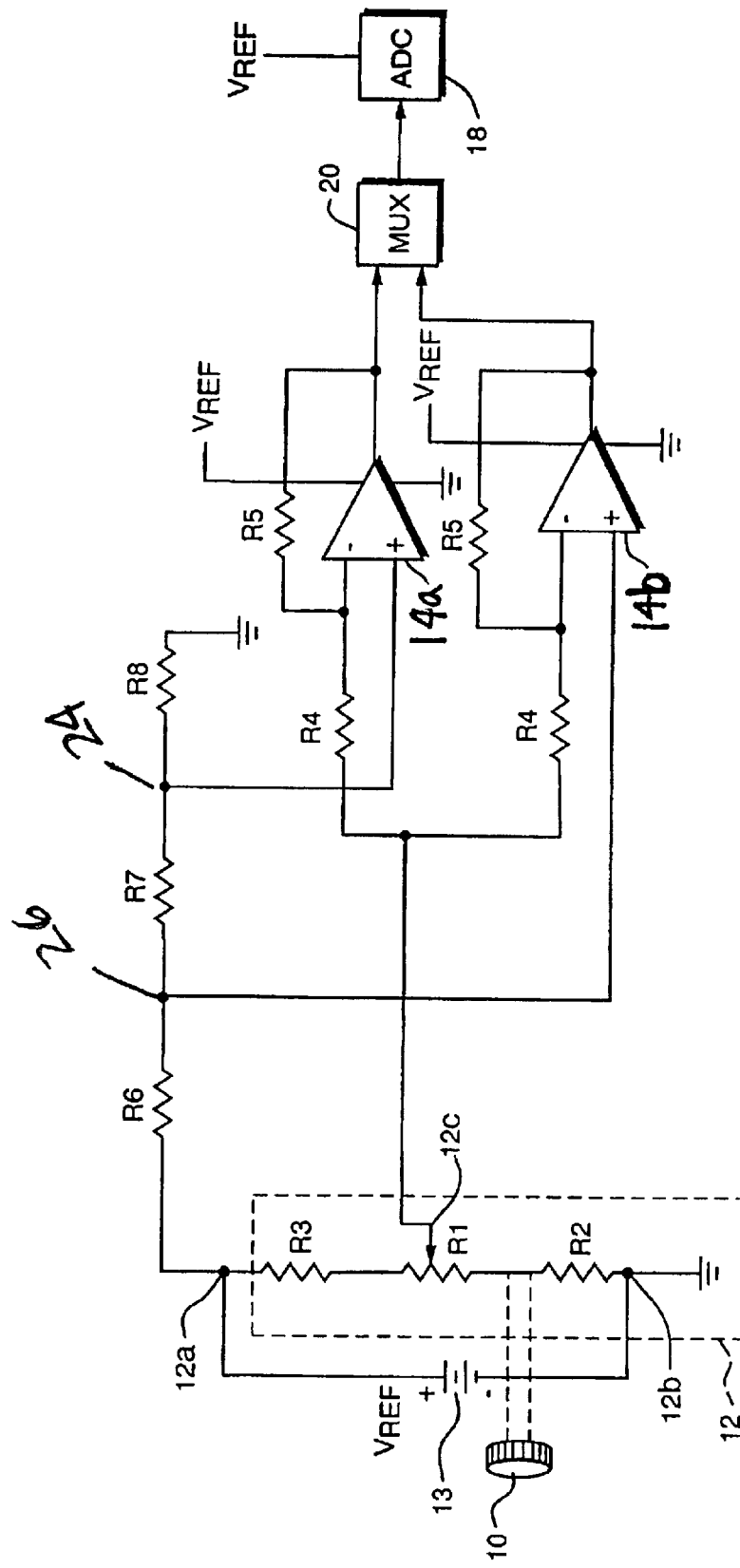
FIG. 1 is a diagram of a thumb wheel controller incorporating the invention.

As shown in the FIG. 1, a thumb wheel controller incorporating the invention includes a thumb wheel 10 mechanically connected to the wiper 12c of a potentiometer 12. A voltage source 13 applies a reference voltage $V_{ref}$ across the potentiometer, specifically to terminals 12a and 12b, the latter of which is connected to ground. By way of illustration, the thumb wheel-potentiometer combination may provide rotation of the wiper 12c over a range of 30 percent of the entire resistance of the potentiometer. In the drawing this is indicated by a potentiometer R1 that is connected between a pair of fixed resistors R2 and R3, the potentiometer R1 constituting 30 percent of the total resistance of the potentiometer 12 and resistors R2 and R3 constituting 35 percent each.

The wiper 12c provides inputs for a pair of operational amplifiers 14a and 14b. The outputs of the amplifiers are selectively passed to an analog-digital converter (ADC) 18 by a multiplexer 20. The reference voltage for the converter 18 is provided by the voltage source 13.

Each of the amplifiers 14a and 14b is connected in a circuit that includes an input resistor R4, connected between the wiper 12c and the inverting input terminal of the amplifier, and a feedback resistor R5 connected between the inverting input terminal and the output terminal of the amplifier. The non-inverting input terminals of the amplifiers 14a and 14b are connected to taps on a voltage divider, comprising resistors R6–R8, connected across the voltage source 13. The voltages at nodes 24 and 26 thus provide bias voltages for the amplifiers.

The amplifiers 14a and 14b are "rail-to-rail" amplifiers powered by the voltage source 13. Thus their outputs are constrained to the voltage range 0-$V_{ref}$. Within the corresponding input voltage ranges at the wiper 12c, their outputs are linearly related to the differences between the respective bias voltages and the wiper voltages. The gains of the amplifier circuits are set to make the output ranges of the amplifiers correspond to the respective upper and lower segments of the rotational range of the wiper 12c, i.e., above and below the center position of the wiper 12c.

More specifically, assume that a central deadband from 49 percent to 51 percent of the total potentiometer resistance is desired and that a range tolerance of 1 percent at each end of the rotational range of the wiper 12c is desired. Amplifier 14a will then be connected to cover a lower range segment of 36–49 percent of the total resistance of the potentiometer 12, as measured from the lower terminal 12b. Amplifier 14b will be connected to cover an upper range segment of 51–64 percent of the total resistance. Each amplifier unit will thus cover a range of 13 percent of the total potentiometer resistance, equivalent to 13 percent of the voltage $V_{ref}$ of the reference source 13.

In order for the amplifier outputs to cover the fill range of 0-$V_{ref}$, the resistors R4 and R5 should have relative values that provide a gain of 1/0.13=7.69. Specifically, with the foregoing assumptions, and assuming a negligible voltage drop in the potentiometer due to the input currents of the amplifier circuits, R5/R4=7.69. Furthermore, to position the operating ranges of the amplifier units within the upper and lower ranges of the wiper 12c, the bias voltages provided by the resistors R6–R8 are such that the voltage at the node 24 corresponds to an output voltage of zero for the amplifier 14a when the wiper 12c is at the upper end of its lower range segment. Similarly, the voltage at the node 26 is corresponds to a zero output voltage of the amplifier 14b when the wiper 12c is at the upper end of the upper range segment.

With this arrangement, the linear range of the amplifier 14a corresponds to the lower range segment of the potentiometer wiper 12c and the linear range of the amplifier 14b corresponds to the upper range segment of the wiper. Each of the amplifiers reaches its maximum output voltage, $V_{ref}$, at the lower end of the corresponding range segment of the wiper 12c. The amplifier saturates at that point and therefore maintains that output voltage for lower positions of the wiper 12c. Above the upper ends of the lower and upper range segments of the potentiometer wiper 12c, the respective outputs of the amplifiers 14a and 14b are zero, in as much as the output voltage cannot decrease below that value.

Figure 2:
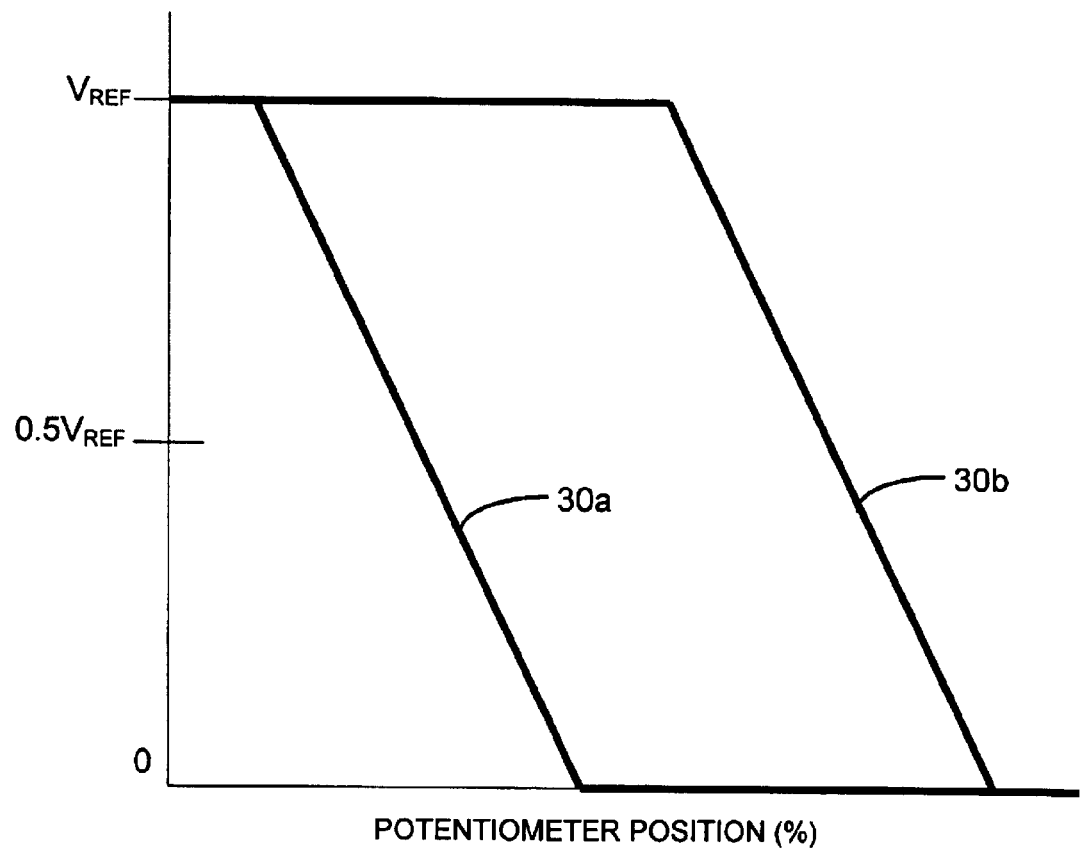
FIG. 2 is a graph of amplifier output voltages as a function of thumb wheel position.

As a result, the amplifier outputs exhibit the characteristics depicted in FIG. 2, in which the curve 30a represents the output of the amplifier 14a and the curve 30b represents the output of the amplifier 14b. Specifically, the curve 30a has a linear region corresponding to the lower potentiometer range segment as described above and the curve 30b has a linear region corresponding to the upper potentiometer range segment. Below the respective potentiometer range segments the curves have a fixed value of $V_{ref}$. When the wiper 12c is in the desired deadband around its mid position, the output of the amplifier 14a is zero and the output of the amplifier 14b is $V_{ref}$, a condition that is readily discernable by suitable logic circuitry to which the output of the ADC 18 is applied.

In practice, it may be desirable to account for the voltage drops in the potentiometer 12 resulting currents between the wiper 12c and the amplifier circuits. In that case, the various resistances in an exemplary controller might have the following values:

| | |
|---|---|
| R1 4.27 kΩ | R5 806 kΩ |
| R2 2.6 kΩ | R6 100 kΩ |
| R3 2.6 kΩ | R7 28.7 kΩ |
| R4 100 kΩ | R8 100 kΩ |

It will be apparent that the invention provides accurate thumb-wheel control with an expanded digital output range. It also provides a highly desirable deadband around the center position of the thumb wheel, without compromising the resolution of the digital output. These advantages are accomplished with a low-cost circuit that employs inexpensive analog components to match the digital range to the range of thumb-wheel rotation

What is claimed is:

1. A potentiometer controller comprising:
   (a) a potentiometer having a movable wiper, the wiper having a mid-point position and upper and lower operating range segments on opposite sides of the mid-point position;
   (b) a mechanical actuator connected to the wiper for manual control of the wiper position;
   (c) a voltage source connected to apply a voltage across the potentiometer,
   (d) a first amplifier circuit electrically coupled to the potentiometer wiper and having a linear amplification characteristic corresponding to the extent of the lower range segment of the wiper;
   (e) a second amplifier circuit electrically coupled to the potentiometer wiper and having a linear characteristic corresponding to the extent of the upper range segment of the wiper;
   (f) means for biasing the first amplifier circuit so that its linear characteristic coincides with the range of voltages at the wiper throughout the lower wiper range segment thereof;
   (g) means for biasing the second amplifier circuit so that its linear characteristic coincides with the range of voltages at the wiper throughout the upper range segment thereof; and
   (h) means for converting the outputs of the amplifier circuit to digital representations.

2. The controller of claim 1:
   (a) in which said converting means is a single analog-digital converter; and
   (b) including means for selectively applying the outputs of the amplifiers to the converter.

3. The controller of claim 1 including means connecting said voltage source as a reference for the converting means.

4. The controller of claim 1:
 (a) in which said amplifier circuits have unipolar outputs, and
 (b) including means connecting the voltage source to the amplifier circuits whereby the linear regions of the characteristics of the amplifiers extend between zero and V volts.

5. The controller of claim 1 including:
 (a) means providing the first amplifier circuit with a gain such that the linear region of its amplification characteristic coincides with the maximum and minimum voltages of the potentiometer wiper in the lower range segment thereof; and
 (b) means providing the second amplifier circuit with a gain such that the linear region of its amplification characteristic coincides with the maximum and minimum voltages of the potentiometer wiper in the upper range segment thereof.

6. The controller of claim 5 in which said bias means:
 (a) biases the first amplifier circuit so that its output voltage is zero when the potentiometer wiper is at or above the upper end of its lower range segment, and
 (b) biases said second amplifier circuit so that its output voltage is zero when the potentiometer wiper is at or above the upper end of its upper range segment.

* * * * *